March 24, 1970
W. L. GREIN
3,502,902
SWEEP CIRCUIT HAVING A VARIABLE HOLD-OFF TIME INTERVAL
Filed Sept. 27, 1966
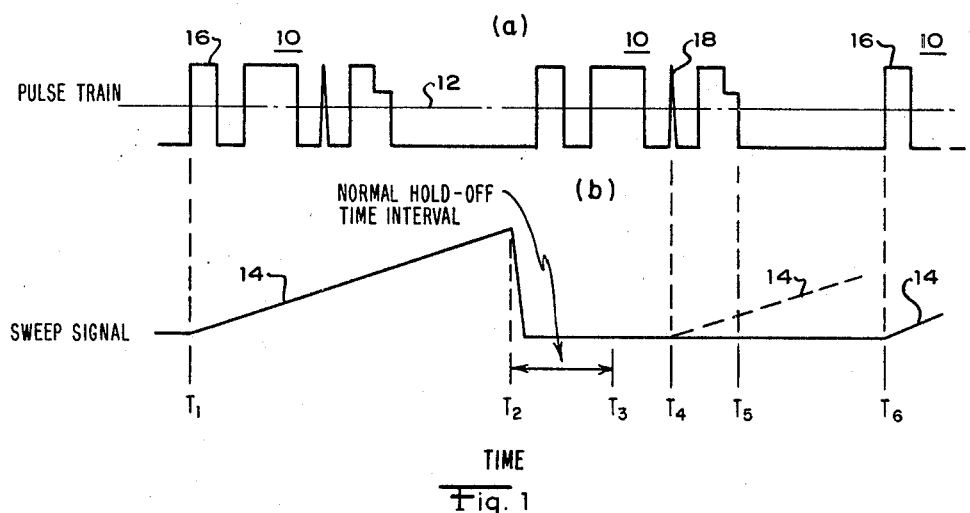
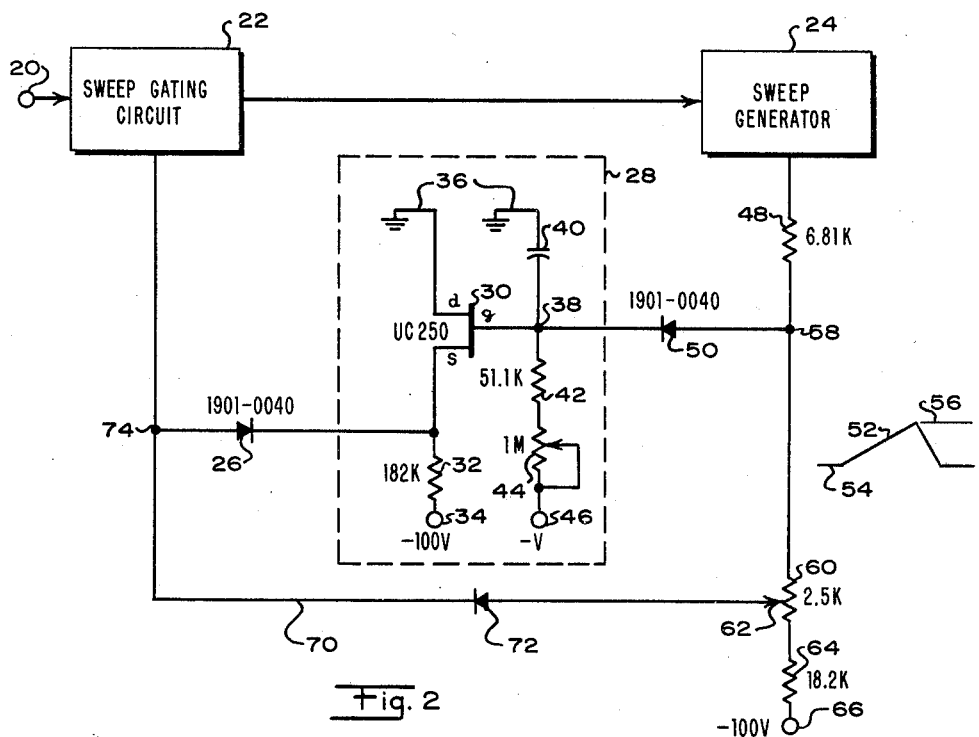
INVENTOR
WILLIAM L. GREIN
BY Roland S. Griffin
ATTORNEY

United States Patent Office 3,502,902
Patented Mar. 24, 1970

3,502,902
SWEEP CIRCUIT HAVING A VARIABLE
HOLD-OFF TIME INTERVAL
William L. Grein, Colorado Springs, Colo., assignor to
Hewlett-Packard Company, Palo Alto, Calif., a corporation of California
Filed Sept. 27, 1966, Ser. No. 582,362
Int. Cl. H03k 4/08
U.S. Cl. 307—228
6 Claims

ABSTRACT OF THE DISCLOSURE

A sweep circuit is responsive to a trigger signal for producing a sweep signal only when an applied hold-off control signal reaches a set signal level. The time required for the control signal to reach this set signal level may be adjusted by a variable resistor in a hold-off control circuit to make the hold-off time interval as long as the sweep time interval.

---

This invention relates to a sweep circuit having a variable hold-off time interval that may be made as long as the sweep time interval.

Conventional oscilloscopes typically do not provide a stable display of asymmetrical pulse trains that do not recur as multiples of the sweep repetition rate. The reason for this is described with the aid of FIGURE 1(a), which illustrates such a pulse train 10, and FIGURE 1(b), which illustrates the operation of a sweep circuit. During operation of a conventional sweep circuit having a positive trigger slope and a trigger level as indicated by the broken line 12, the sweep signal 14 is started at time $T_1$ by the first pulse 16 of the train 10. The forward portion of the sweep signal 14 is terminated at time $T_2$, and the sweep signal cannot be restarted until time $T_3$, the end of the normal hold-off time interval. Thus, as indicated by the dashed line 14, the sweep signal is started again at time $T_4$ by the third pulse 18 of the train 10 and depending upon the pulse train timing may be subsequently restarted by any one of the other pulses of the train, thereby making the oscilloscope display appear to be unstable. A stable oscilloscope display of the pulse train 10 can be provided if the hold-off time interval is adjusted so that the sweep signal 14 cannot be started again until after time $T_5$. The sweep signal 14 is then started at time $T_6$ by the first pulse 16 of the train 10 and is subsequently restarted only by the first pulse 16 of the train. In order to insure a stable display of all asymmetrical pulse trains that do not recur as multiples of the sweep repetition rate, it is necessary that the hold-off time interval be adjustable so that it may be made as long as the sweep time interval. Although some sweep circuits have an adjustable hold-off time interval for providing trigger stability, they do not have a variable hold-off time interval that may be made as long as the sweep time interval.

Accordingly, it is the principal object of this invention to provide a sweep circuit having a variable hold-off time interval that may be made as long as the sweep time interval so as to permit stable oscilloscope display of asymmetrical pulse trains that do not recur as multiples of the sweep repetition rate.

It is another object of this invention to provide a sweep circuit having a hold-off time interval that may be varied over a range that is equal to a substantial portion of the sweep time interval and that may be made as long as the sweep time interval by adjustment of a single control without altering the trigger level.

These objects are accomplished in accordance with the illustrated embodiment of this invention by providing sweep means that are responsive to a trigger signal for producing a sweep signal only when a control signal supplied to the sweep means reaches a set signal level and by connecting control means to the sweep means for supplying thereto a control signal that reaches the set signal level at the end of a selected hold-off time interval following termination of the sweep signal. A single control is provided for varying the hold-off time interval so that it may be made as long as the sweep time interval without altering the trigger level.

Other and incidental objects of this invention will be apparent from a reading of this specification and an inspection of the accompanying drawing in which:

FIGURE 1(a), already referred to above, is a waveform diagram showing an asymmetrical pulse train that does not recur as a multiple of the sweep repetition rate;

FIGURE 1(b), already referred to above, is a waveform diagram showing a sweep signal and illustrating the operation of a sweep circuit; and FIGURE 2 is a circuit diagram showing a sweep circuit having a variable hold-off time interval according to the preferred embodiment of this invention.

Referring now to the drawing, and particularly to FIGURE 2, there is shown a sweep circuit comprising a trigger input 20 that is connected by a sweep gating circuit 22 to a sweep generator 24. The sweep gating circuit 22 has a pass operating state during which the sweep generator 24 produces a sweep signal 14 in response to a trigger signal applied to the trigger input 20 and has an inhibit operating state during which the sweep generator is unresponsive to a trigger signal applied to the trigger input. A diode 26 connects a hold-off time interval control circuit 28 to the sweep gating circuit 22. This hold-off time interval control circuit 28 includes a gain element having an input that controls the signal level of the output but having substantially no current leakage path between the input and the output so that the input is substantially isolated from the output. The gain element may comprise, for example, a triode or a field effect transistor 30 which has its source electrode $s$ connected to the diode 26 and through a bias resistor 32 to a source 34 of negative bias potential, its drain electrode $d$ connected to a source 36 of ground potential, and its gate electrode $g$ connected to a node 38. The gate electrode $g$ is controlled by a gate bias circuit comprising a hold-off capacitor 40 that is serially connected between the node 38 and the source 36 of ground potential and comprising a fixed hold-off resistor 42 and a variable hold-off resistor 44 that are serially connected between the node 38 and a source 46 of negative bias potential. The hold-off capacitor 40 is initially charged to bias the gate electrode $g$ to a voltage level at which the voltage level of the source electrode $s$ is sufficiently negative with respect to ground to forward bias the diode 26 and thereby set the sweep gating circuit 22 to the pass operating state. Thus, assuming a positive trigger slope and a trigger level 12 when the recurring pulse train 10 is applied to the trigger input 20, the sweep generator 24 is triggered by the first pulse 16 of the train so as to start the sweep signal 14 at time $T_1$.

The sweep generator 24 is connected by a resistor 48 to a diode 50 for supplying thereto an attenuated sweep signal 52, which as it moves from the voltage level 54 to the voltage level 56 forward biases the diode 50. Diode 50 is connected to the node 38 so that when the diode 50 is forward biased the hold-off capacitor 40 is discharged, thereby raising the voltage level of the gate electrode $g$ of field effect transistor 30. As the voltage level of the gate electrode $g$ rises, the voltage level of the source electrode $s$ rises and diode 26 is reverse biased so as to disconnect the field effect transistor 30 from the sweep gating circuit 22. The junction 58 between resistor 48 and diode 50 is connected through a resistor 60 having an adjustable tap 62 and through a resistor 64 to a source 66 of negative bias potential. A feedback path 70, which includes a diode 72 that is initially reverse biased to inactivate the feedback path, connects the adjustable tap 62 of resistor 60 to the junction 74 between diode 26 and sweep gating circuit 22. As the attenuated sweep signal 52 moves from voltage level 54 to voltage level 56 the diode 72 is forward biased so as to activate the feedback path 70, thereby setting the sweep gating circuit 22 to the inhibit operating state. After the forward portion of the sweep when the attenuated sweep signal falls from the voltage level 56 to the voltage level 54, the diode 50 is reverse biased so that the hold-off capacitor 40 begins to charge through the hold-off resistors 42 and 44. As the hold-off capacitor 40 is charged the voltage level at the gate electrode g drops toward the voltage level 54. Shortly before this voltage level 54 is reached the voltage level at the source electrode s becomes sufficiently negative with respect to ground to forward bias the diode 26, thereby resetting the sweep gating circuit 22 to the pass operating state.

The rate at which the hold-off capacitor 40 is charged is determined by the values of the hold-off capacitor 40, the fixed hold-off resistor 42, and the variable hold-off resistor 44. Since the field effect transistor 30 produces an output voltage at its source electrode s that varies substantially proportionally with the bias voltage at its gate electrode g and, hence with the voltage on the hold-off capacitor 40 while drawing substantially no current from the node 38, the variable hold-off resistor 44 controls the rate of change of the voltage level at the source electrode s during charging of the hold-off capacitor. Thus, a variable hold-off resistor 44 is used that has sufficient range to vary the charge rate of the hold-off capacitor 40 by the amount required to vary the hold-off time interval following termination of the forward portion of the sweep signal 14 enough to make the hold-off time interval as long as the sweep time interval. A hold-off time interval that is variable over this range is required to provide a stable oscilloscope display for all pulse trains. The variable hold-off resistor 44 provides a single control for selecting the required hold-off time interval so that the sweep generator 24 will be triggered again at time $T_6$ by the first pulse 16 of the train without altering the trigger level.

Representative values are indicated in FIGURE 2 for all of the circuit elements but the hold-off capacitor 40 and the bias potential of source 46. The value of the hold-off capacitor 40 varies with the sweep time interval, and the bias potential of the source 46 is adjusted to compensate for the gate-to-source voltage $V_{gs}$ of the field effect transistor 30.

I claim:
1. A sweep circuit having a variable hold-off time interval and comprising:
   sweep means for producing a sweep signal, which has a forward portion, in response to a trigger signal applied to the sweep means when a control signal that is at least equal to a first signal level is also applied to the sweep means, said sweep means being unresponsive to a trigger signal applied thereto when a control signal that is equal to a second signal level is applied to the sweep means; and
   control means being connected to the sweep means for supplying thereto a control signal that before a sweep signal is produced by the sweep means is at least equal to the first signal level and being responsive to each sweep signal produced by the sweep means for changing the control signal to the second signal level, said control means changing the control signal from the second signal level so that it reaches the first signal level again at the end of a selected hold-off time interval following termination of the forward portion of the sweep signal and including adjustable means for varying the end of this hold-off time interval within a time interval at least as long as the sweep time interval, whereby the hold-off time interval may be made longer than the sweep time interval.

2. A sweep circuit as in claim 1 wherein said control means comprises:
   a control device having an input and an output, said input controlling the signal level of the output;
   means, including the output of the control device, forming an output circuit for the control device and connecting the output of the control device to the sweep means for supplying a control signal produced at the output of the control device to the sweep means; and
   means, including the adjustable means, forming an input bias circuit for the control device and connecting this bias circuit to the input of the control device for biasing the control device to produce at its output a control signal that before a sweep signal is produced by the sweep means is at least equal to the first signal level, said input bias circuit being responsive to each sweep signal produced by the sweep means for biasing the control device to change the control signal to the second signal level and being subsequently operable to change the control signal so that it reaches the first signal level again at the end of the selected hold-off time interval.

3. A sweep circuit as in claim 2 wherein said control device is a gain element having an input and an output, said input being substantially isolated from the output although controlling the output signal level.

4. A sweep circuit as in claim 3 wherein said input bias circuit comprises:
   a storage element connected to the input of the gain element;
   a variable resistance element also connected to the input of the gain element and forming the adjustable means, said variable resistance element having a range sufficient to make the hold-off time interval at least as long as the sweep time interval;
   means, including a source of bias potential, connected in series with the storage element and the variable resistance element for charging the storage element so as to bias the gain element to produce a control signal that before a sweep signal is produced by the sweep means is at least equal to the first signal level; and
   means connecting the input of the gain element to the sweep means for discharging the storage element during each sweep signal produced by the sweep means so as to bias the gain element to change the control signal to the second signal level;
   said storage element being subsequently recharged at a rate selected by the setting of the variable resistance element so as to bias the gain element to change the control signal so that it reaches the first signal level again at the end of the selected hold-off time interval.

5. A sweep circuit as in claim 4 wherein said sweep means comprises:
   a trigger input for receiving a trigger signal;
   a sweep generator being responsive to a trigger signal for producing a sweep signal having a forward portion;
   means, including a sweep gating circuit, connecting the sweep generator to the trigger input, said sweep gating circuit having a pass operating state during which the sweep generator is responsive to a trigger signal applied to the trigger input for producing a sweep signal and an inhibit operating state during which the sweep generator is unresponsive to a trigger signal applied to the trigger input;

means, including a first switching element having a conductive and a nonconductive state, connecting the sweep generator to the input of the gain element, said first switching element being responsive to the sweep generator during the forward portion of each sweep signal for being set to the conductive state during which the storage element discharges so that the control signal produced by the gain element changes from the first to the second signal level and being responsive to the sweep generator after the forward portion of the sweep for being set to the nonconductive state during which the storage element charges through the variable resistance element so that the control signal produced by the gain element changes from the second signal level at a rate to reach the first signal level again at the end of the selected hold-off time interval;

means, including a second switching element having a conductive and a nonconductive state, connecting the output of the gain element to the sweep gating circuit, said second switching element being responsive to the control signal when it changes from the first signal level to the second signal level for being set to the nonconductive state during which the sweep gating circuit is set to the inhibit operating state and being responsive to the control signal when it again reaches the first signal level for being set to the conductive state during which the sweep gating circuit is set to the pass operating state by the control signal; and means connecting the sweep generator to the sweep gating circuit for setting the sweep gating circuit to the inhibit operating state during operation of the second switching element in its nonconductive state.

6. A sweep circuit as in claim 5 wherein said gain element is a field effect transistor.

References Cited

UNITED STATES PATENTS

| 3,122,652 | 2/1964 | Kobbe et al. | 307—228 X |
| 3,138,764 | 6/1964 | Dalton et al. | 307—228 X |
| 3,257,567 | 6/1966 | Kotas | 307—228 |
| 3,350,576 | 10/1967 | Zimmerman | 307—225 |
| 3,408,580 | 10/1968 | Moriyasu | 307—228 X |
| 3,432,762 | 3/1969 | La Porta | 328—181 X |

JOHN S. HEYMAN, Primary Examiner

S. D. MILLER, Assistant Examiner

U.S. Cl. X.R.

328—181, 185